United States Patent [19]

Haeger

[11] 4,391,358

[45] Jul. 5, 1983

[54] HARDWARE PRESS AND PUNCH APPARATUS

[76] Inventor: Virgil J. Haeger, 1144 Post Rd., Oakdale, Calif. 95361

[21] Appl. No.: 204,200

[22] Filed: Nov. 5, 1980

[51] Int. Cl.³ .............................................. B23Q 11/00
[52] U.S. Cl. ................................... 192/130; 192/134; 29/708; 72/1
[58] Field of Search ......................... 29/708; 72/1; 192/129 A, 134, 130; 200/61.42

[56] References Cited

U.S. PATENT DOCUMENTS

| | | | |
|---|---|---|---|
| 1,684,296 | 9/1928 | Brodsky | 192/134 |
| 2,387,478 | 10/1945 | Tiffany | 192/130 |
| 2,400,486 | 5/1946 | Carlyle | 192/134 |
| 2,438,837 | 3/1948 | Archer et al. | 72/465 |
| 2,767,819 | 10/1956 | Cullerton, Jr. et al. | 192/134 |
| 3,240,310 | 3/1966 | Sandeman | 192/134 |
| 3,315,049 | 4/1967 | Cain | 200/61.42 |
| 3,487,182 | 12/1969 | Grundy | 192/134 |
| 3,803,898 | 4/1974 | Speakman | 72/470 |
| 3,866,004 | 2/1975 | Nawrocki | 192/134 |
| 3,939,314 | 2/1976 | Loeser | 192/134 |
| 4,060,160 | 11/1977 | Lieber | 192/130 |
| 4,075,961 | 2/1978 | Harris | 192/129 A |

Primary Examiner—Daniel C. Crane
Attorney, Agent, or Firm—John J. Leavitt

[57] ABSTRACT

Presented is a hardware punch and/or press apparatus adapted to assemble fastening devices to or punch holes in hardware for various purposes. The apparatus includes a stationary tool or anvil on which hardware on which an operation is to be performed is supported, and a hydraulically operated ram adapted to move against the work piece or hardware upon activation of an appropriate switch. In one aspect of the invention, a mechanism is provided to effect retraction of the hydraulically operated ram without the imposition of a destructive pressure if the operator's finger is contacted by the ram.

7 Claims, 11 Drawing Figures

HARDWARE PRESS AND PUNCH APPARATUS

BACKGROUND OF THE INVENTION

1. Field of the Invention

This invention relates to hardware presses, and particularly those types of presses used by manufacturers of hardware that require the imposition or placement on such hardware of fastening devices such as rivets, panel fasteners, eyelets, spacers, studs, nuts and standoffs in flat or preformed sheet metal assemblies, and particularly to such a press apparatus that includes a ram that is hydraulically actuated, electrically controlled, and which incorporates a safety feature that prevents destructive pressure being imposed on the hydraulic ram if the operator's finger or hand is contacted by the hydraulically operated ram.

2. Description of the Prior Art

It is believed that the prior art related to the subject matter of this invention may be found in Class 192, sub-classes 129A, 130, 131H, 134 and 137. Additionally, Class 200, sub-class 61.42 may contain prior art that is related to the subject matter of the present invention. A search of these classes and sub-classes has revealed the existence of the following U.S. patents:

Mechanical Patents

U.S. Pat. Nos. 2,400,486; 3,487,182; 3,240,310; 2,767,819; 3,708,242; 4,060,160; 3,315,049; 3,939,314; 4,075,961.

Design Patents

U.S. Pat. Nos. D 139,037; D 203,626; D 193,212; D 208,584; D 200,803; D 238,703.

Operators of press and shear equipment in manufacturing plants continue to be maimed by such equipment because adequate controls and safety measures are not incorporated into the operation of the equipment. In many manufacturing facilities, the operator of a hydraulic press may have his forearms and wrists connected by straps to an apparatus attached to the press in such a manner that if the operator's hands or arms are in a position to be crushed by the press, the press is deactivated while the operator's hands remain in a dangerous position. Such safety harnesses and the attendant levers that inactivate the starting circuit of the press are cumbersome and themselves sometimes lead to accidents because they do not permit free movement of the operator's hands. Other types of safety devices have been incorporated in presses and in brakes or shears, and this type is exemplified in U.S. Pat. No. 4,060,160 and comprises a gate that is interposed in an opening leading to the work area and which prevents insertion of the work piece or the hand until the gate is retracted.

I have determined that these various types of safety measures utilized on brakes and presses have many disadvantages, are cumbersome to use, slow down production, and in general are not very well received by manufacturers or production workers. Accordingly, it is one of the principal objects of the present invention to provide an apparatus which incorporates means and operates by a method that permits the ram to automatically retract when it comes in contact with the operator's finger or hand.

It has been found that in the metal working arts, where metal work pieces are supported on or in relation to a piece of equipment adapted to perform one or more operations on the metal work piece, an electrically conductive path is formed between the ram that does the work and the work piece in electrically conductive contact with the ram and with the anvil on which the work piece is supported. Accordingly, it is another object of the present invention to utilize the electrical conductivity of the work piece in conjunction with the electrical conductivity of the ram and the anvil associated therewith for controlling advancement of the ram.

I have discovered that in metal working equipment where advancement of the ram is controlled electrically, if a relatively non-conductive member is substituted for the work piece, or is interposed between the ram and the work piece, the electrically conductive path therebetween is broken, and the non-conductance of electricity between the ram and the work piece because of the interposition of the relatively nonelectrically conductive member, such as the operator's finger or hand, may be utilized to initiate a retraction of the ram until the electrically non-conductive member is removed. Accordingly, another object is to provide a hardware press that operates by this mode, and which, in addition, includes a "mode switch" which may be activated so that upon intentional command the press will complete the cycle of operation in disregard of the interposition of the non-conductive member.

Another object of the invention is the provision of a hydraulically operated press or punch apparatus that is uncomplicated in its construction, easy for even an unskilled operator to operate, and which includes safety features which promote the welfare of the operator and the employer.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claim.

SUMMARY OF THE INVENTION

In terms of broad inclusion, the hardware press of the invention comprises a base structure on which is supported a pedestal. The pedestal provides a cantilever arm on which is mounted a ram member that is actuated hydraulically to advance or retract in relation to an anvil supported on the pedestal in association with the ram so that a work piece may be inserted in the space between the anvil and the ram. Hydraulic and electrical control means cooperate in one aspect of the invention to permit the ram to be retracted when an electrically non-conductive member inserted between the ram and the anvil or work piece comes into contact with the ram. In another aspect of the invention, control means are provided which must intentionally be set by the operator to condition the hardware press to advance the ram upon a selected sequence of signals being given, even if an electrically non-conductive object is contacted by the ram or interposed between the ram and the work piece or anvil, but only upon specified conditions that must be intentionally willed by the operator.

Still another aspect of the invention is the provision of a hydraulically operated press in which the amount of pressure exerted by the ram is controllable to selected pressures in a range from very low pressures measured in ounces to high pressures measured in thousands of pounds.

DESCRIPTION OF THE PREFERRED EMBODIMENT

Figure 1:
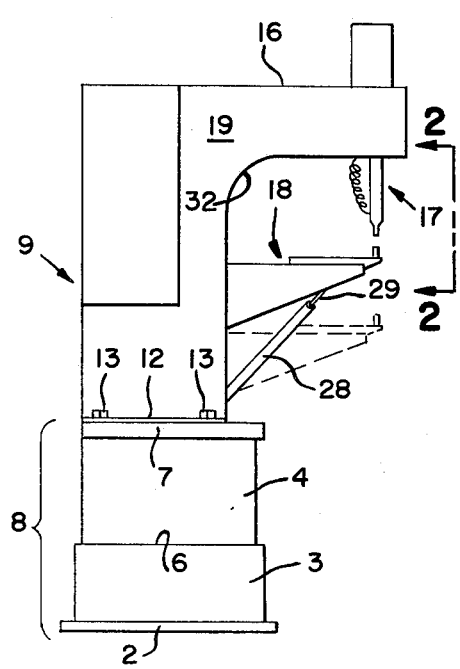
FIG. 1 is a side elevational view in reduced scale of the entire hardware press assembly of the invention.

In terms of greater detail, the hardware press of the invention comprises a heavy support plate 2 which in the illustration is not provided with castor wheels, but which may obviously be provided with such castor wheels if it is desired that the equipment be easily movable from one position to another as is frequently the case. Mounted on the support plate 2 is an enclosed reservoir 3 which constitutes the tank within which hydraulic fluid is contained and from which it is pumped and to which it is returned during operation of the press. Mounted on the reservoir 3, which is fabricated from heavy sheet metal, is a base cabinet 4 which is welded to the upper surface 6 of the reservoir 3 so that the cabinet 4 and the reservoir 3, cooperating with the support plate 2, provide a heavy and substantially vibration-free support for the top plate 7 which is preferably welded to the cabinet sides and front 4 to complete the base assembly 8 of the hardware press. Bolted on the top plate 7 is a pedestal designated generally by the numeral 9, formed preferably from heavy steel plates appropriately welded together and to a pedestal base plate 12 by which the pedestal 9 is bolted to the top plate 7 by appropriate cap screws 13. The pedestal is fabricated from steel plates welded together to provide a hollow interior 14 and a forwardly projecting cantilever arm portion 16 on the free end of which is mounted a ram assembly designated generally by the numeral 17, and an anvil assembly designated generally by the numeral 18.

The pedestal is comprised of side plates 19 and 21 held apart by an intermediate support plate 22 appropriately welded between the two side plates. The underside of the cantilever portion 16 of the pedestal is enclosed by a closure plate 23 as shown in FIG. 3, which is welded between the side plates and to the support plate 22.

The vertically and transversely extending plate 22 forms a rigid support base for the outwardly extending anvil assembly 18 which is adjustably mounted on the plate 22 by appropriate threaded bores 24 formed in a vertical series in the plate 22, and cap screws 26 extending through base plate 27 of the anvil assembly to retain the anvil assembly immovable in a selected position with respect to the support plate 22. To further lend support to the outer end of the cantilever anvil assembly, a support strut 28 is provided adjustably interposed by threaded portion 29 between the outermost end of the cantilevered anvil assembly 18, and the base of the support plate 22 as shown in FIG. 3. A cross piece 31 is adapted to fit snugly in the space between the side walls 19 and 21 and to bear against the support plate 22.

Figure 3:
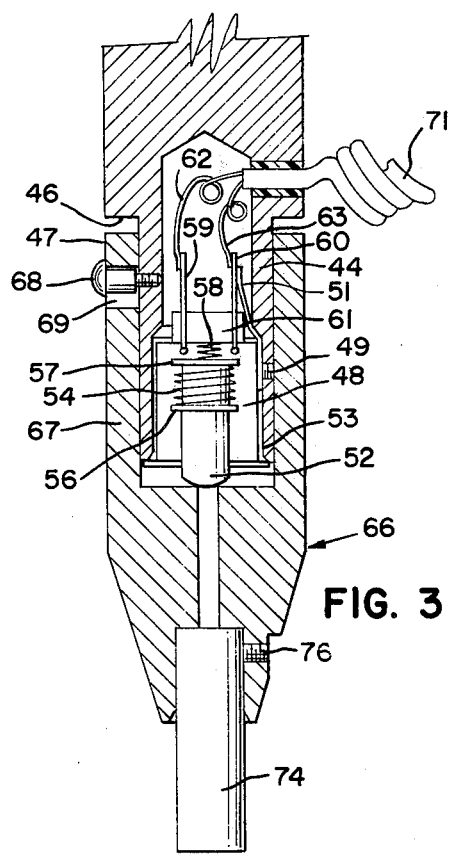
FIG. 3 is an enlarged fragmentary sectional view of a portion of the ram designated by the line 3—3 in FIG. 2.
Figure 2:
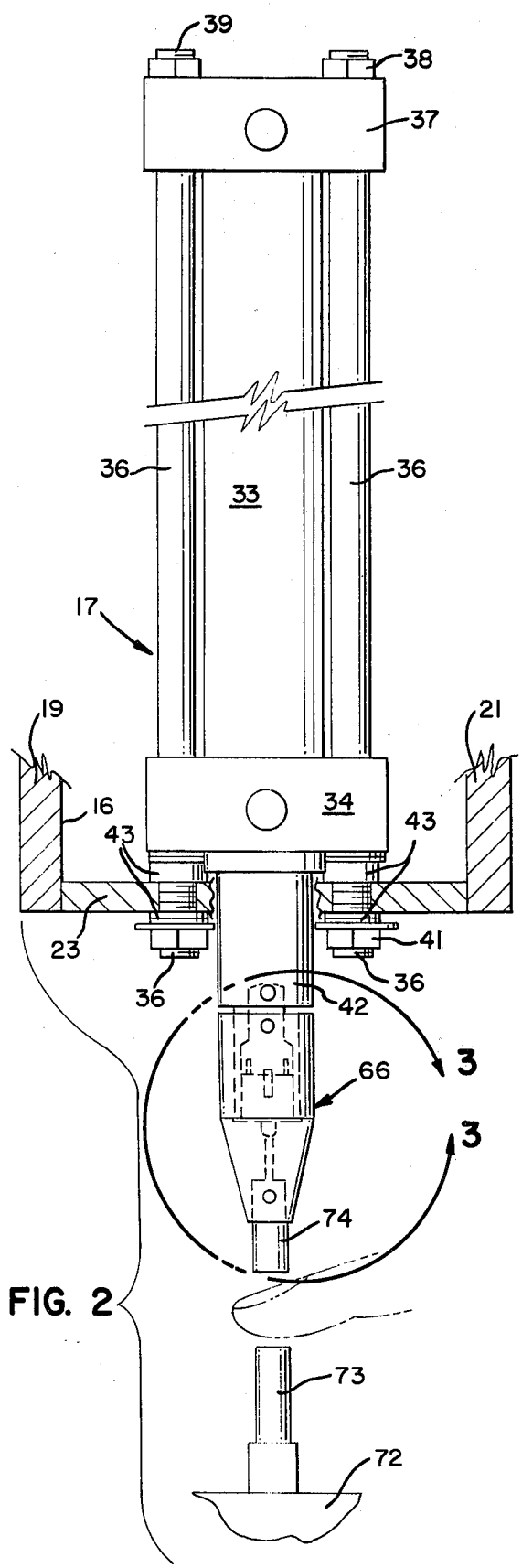
FIG. 2 is an enlarged fragmentary elevational view, partly in section, taken in the direction of the arrows indicated on the line 2—2 of FIG. 1 and illustrating the safety feature of the hardware press which causes retraction of the ram if the operator's finger is interposed between the ram and the anvil.

Referring to FIGS. 2 and 3, it will there be seen that the ram assembly 17 is mounted adjacent the extreme end of the cantilever arm portion 16 of the pedestal 9, and that the side plates 19 and 21 extend rearwardly toward the main portion of the pedestal and merge with the main portion of the pedestal in large radiuses 32 that serve to transfer the stress that is imposed on the free end portion of the cantilever arm to the remaining portion of the pedestal, thus increasing the amount of pressure that may be exerted by the hydraulically operated ram assembly 17 without fear of distorting the supporting structure.

As illustrated in FIG. 2, the ram assembly comprises an elongated hydraulic cylinder 33 the lower end of which nests in and is supported by a bearing block 34 which is removably captured and secured to the plate 23 by appropriate through-bolts 36, conveniently four in number, and which extend upwardly through an upper bearing block 37 where appropriate nuts 38 threaded on the upper threaded ends 39 of the through-bolts cooperate with similar nuts 41 threaded to the lower threaded ends of the through-bolts to capture and retain the assembly solidly mounted on the support plate 23. Obviously, the support plate 23 is apertured concentrically with the cylinder to permit passage of the ram 42 therethrough in its excursion between upper and lower positions. It should be noted that in all positions of the ram 42 and the attendant structure dependent thereon, the ram is electrically insulated from the plate 23 by appropriate insulating means 43 in the form of bushings and washers that electrically insulate the cylinder 33 and ram 42 from surrounding structure.

Referring specifically to FIGS. 2 and 3, it will be seen that at its lower end the hydraulic ram 42 is formed with a reduced-in-diameter portion 44 extending below a shoulder 46, and having an interior chamber 47 within which is positioned a normally open micro-switch 48 which works in conjunction with other circuitry (hereinafter described) to provide a safety system for operation of the press in a manner which will effect retraction of the ram if the operator's finger or hand is contacted thereby. The micro-switch is retained in the chamber 47 by an appropriate set screw 49 which also forms an electrically conductive connection with a strap 51 at ground potential. As illustrated in FIG. 3, the micro-switch 48 is provided with an actuator 52 that projects below the extreme lower end 53 of the reduced-in-diameter ram portion 44, the actuator 52 being spring-pressed in a normally-open condition by an appropriate spring 54 working between an abutment plate 56 and a contact plate 57. The contact plate 57 is electrically conductive, and is spring-pressed by spring 58 to retain it spaced from the contact ends of two terminal rods 59 and 60, both of which are held electrically insulated by block 61. The terminal rods 59 and 60, respectively, are in turn electrically connected by the "hot" lead 62 of an electrical power cord and the "ground" lead 63 thereof. It should be noted that the "ground" strap 51 is also connected to the terminal rod 60, thus resulting in the formation of a "ground" potential connection between the lead 63 and the reduced in diameter ram. It should be understood that while I have illustrated the safety switch assembly somewhat schematically, the switch assembly preferably constitutes a separate component held in place by the set screw 49.

Mounted on the reduced-in-diameter ram portion 44 for snug axial sliding movement thereon is an upper tool holder designated generally by the numeral 66, and including an upper skirt portion 67 that concentrically surrounds the reduced-in-diameter ram portion 44 for snug sliding movement thereon. The upper tool holder is retained on the reduced-in-diameter ram portion 44 by a shouldered screw 68 which threadably engages an appropriately threaded bore in the ram portion 44 and bottoms thereon by the shoulder on the screw provided for that purpose. The remaining shank of the shouldered screw 68 fits snugly in a slot 69 formed in the skirt portion 67 so that the upper tool holder 66 may slide axially in an upper direction within the limit imposed by the shoulder 46 on the ram 42, and slide axially downwardly within the limit imposed by the upper end of the slot 69 which comes into contact with the shank of the shouldered screw 68.

To insure a snug sliding fit between the upper tool holder 66 and the reduced ram portion 44, the space between is provided with graphite lubricant, which also provides electrical conductance between the two parts, thus insuring that the upper tool holder is at ground potential with the ram 42. As indicated in FIG. 3, the electrical leads 62 and 63 are enclosed in an appropriate cord or cable 71 that passes through an appropriate aperture in the ram wall communicating with the interior chamber 47. The leads 62 and 63 connect with the electrical circuitry in a manner which will hereinafter be explained in connection with means illustrated in FIGS. 10 and 11.

Mounted rigidly yet removably on the cantilever anvil assembly 18 is a massive and monolithic lower tool holder 72 adapted to removably yet rigidly support thereon a selected lower tool 73. The selected lower tool 73 cooperates with a selected upper tool 74 that is retained in the upper tool holder 76 by an appropriate set screw 76. As indicated in FIG. 2, the safety switch system discussed above operates to retract the ram 42 if the operator's finger or another portion of his hand, or any other relatively electrically non-conductive object is interposed between the upper and lower tools 74 and 73 when the ram is actuated to bring the tools together. It should be noted, as indicated schematically in FIG. 2, that the tool holder 72 is also at electrical "ground" potential and cooperates with the grounding strap 51 and the electrically grounded upper tool holder 66 to insure that an electrical connection is not made between the upper tool holder and the lower tool holder if a non-conductive object such as the operator's finger is interposed between the upper and lower tools 74 and 73, respectively.

Figure 4:
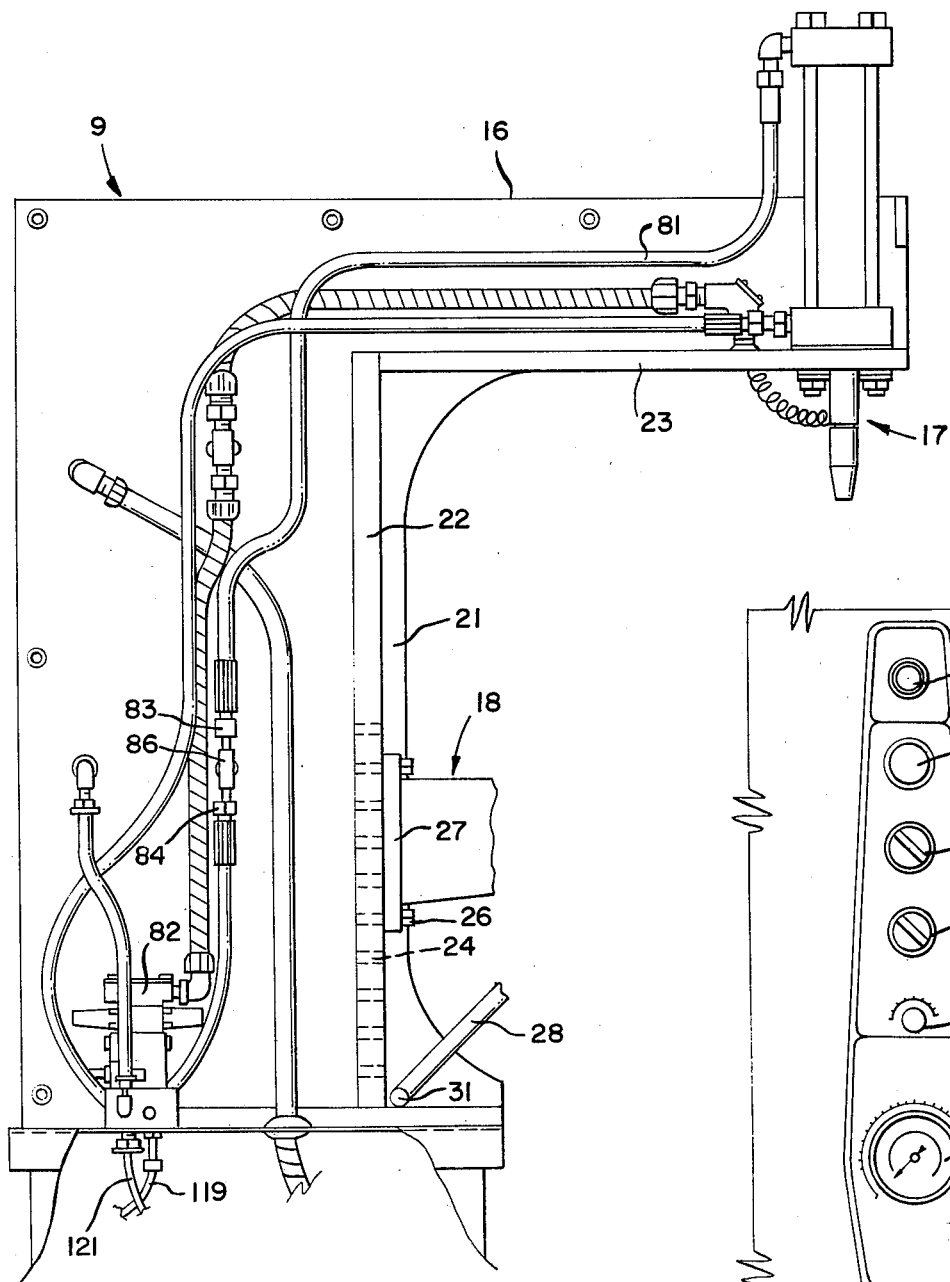
FIG. 4 is a fragmentary side elevational view of the pedestal portion of the hardware press, one of the side walls being removed to disclose the underlying structure.
Figure 6:
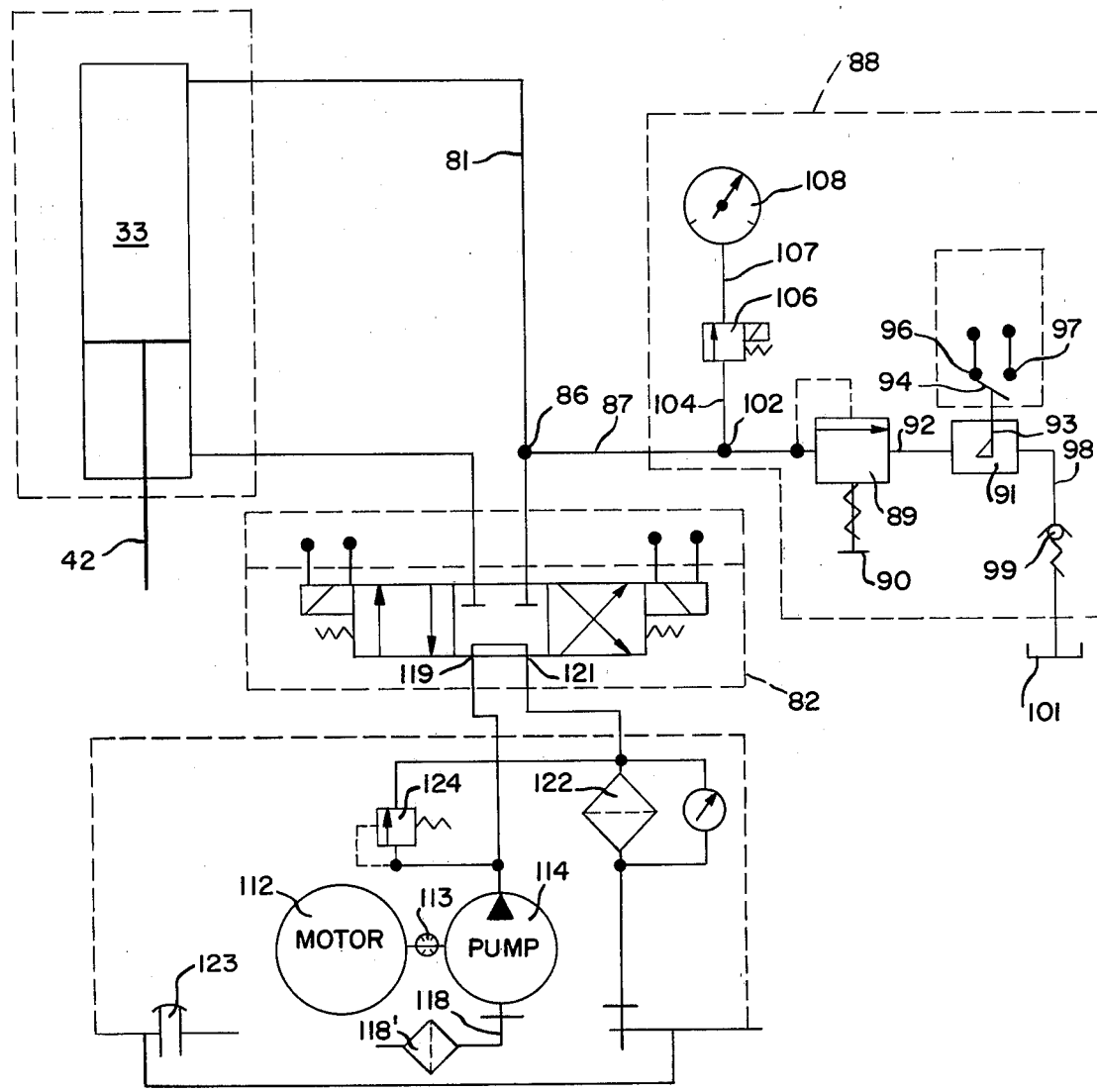
FIG. 6 is a diagrammatic view of the hydraulic circuitry associated with the hardware press.

To operate the hydraulic cylinder 2, which is preferably a double acting type, i.e., operated by hydraulic pressure in both directions, a hydraulic circuit is provided which is illustrated diagramatically in FIG. 6. Structural aspects of the hydraulic circuitry are illustrated in FIGS. 4, 7, 8 and 9. Referring specifically to FIG. 4, it will be seen that the upper or pressure side of the hydraulic cylinder 33 is connected by a conduit 81 with one port of a four-way selector valve 82 such as a Sperry-Vickers solenoid controlled-pilot operated four way valve.

Figure 7:
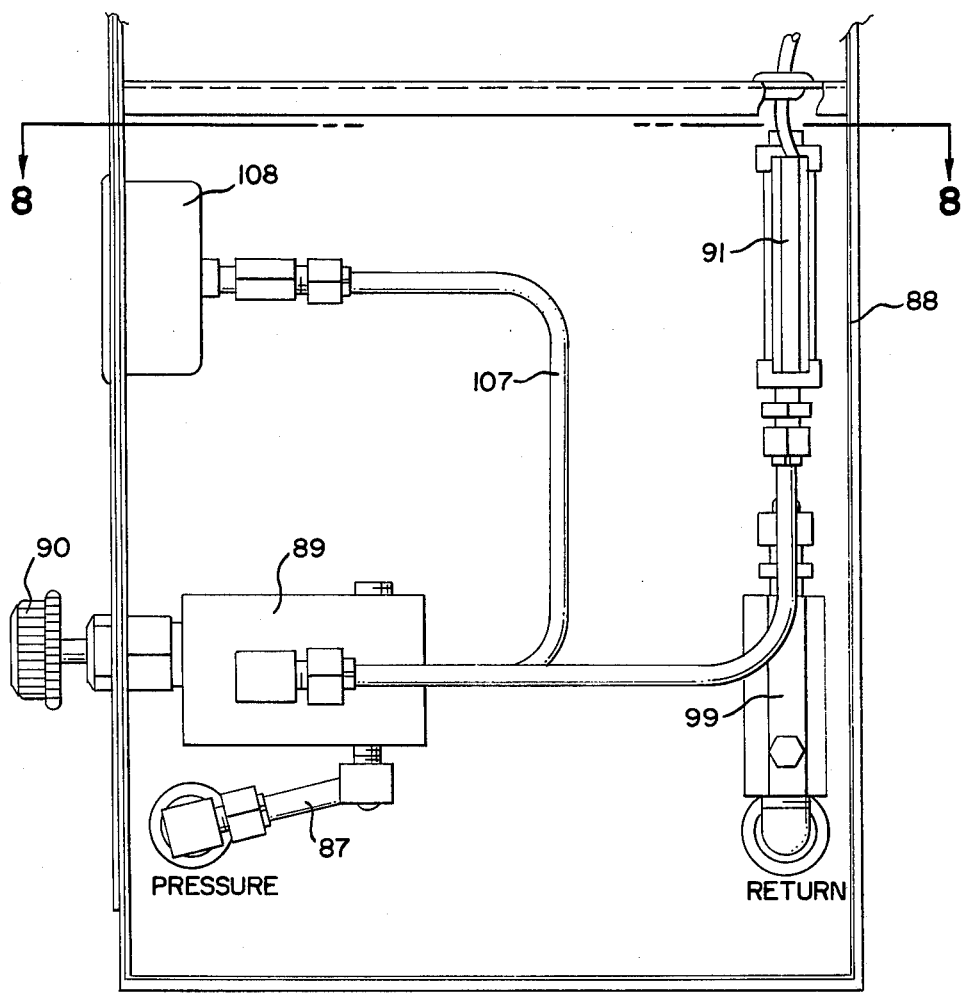
FIG. 7 is a fragmentary view in elevation of the hydraulic circuitry associated with the pressure regulator valve of the hardware press.
Figure 8:
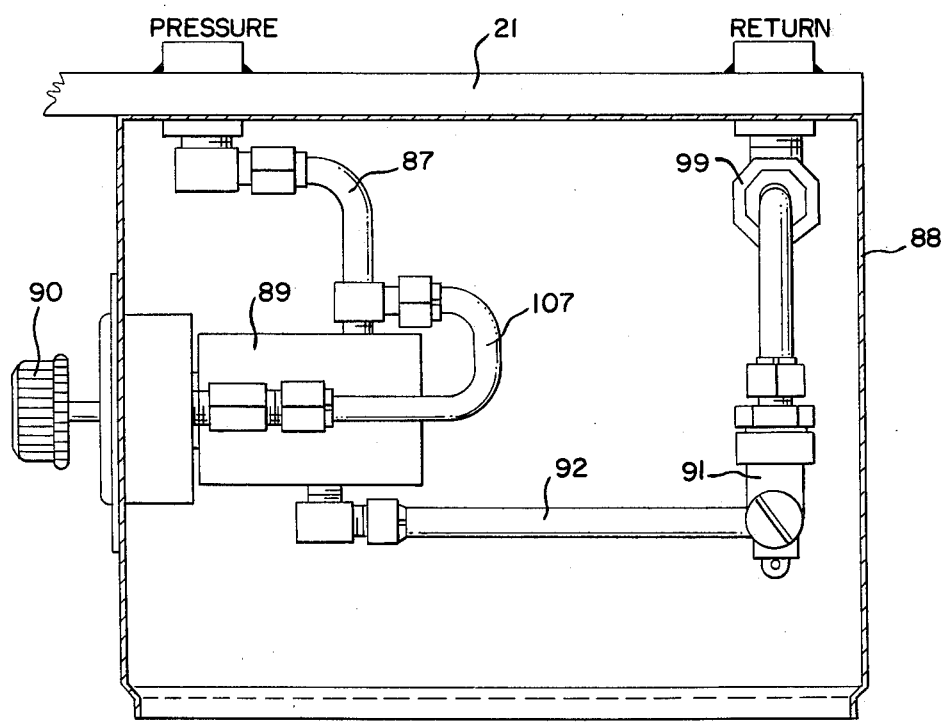
FIG. 8 is a horizontal sectional view taken in the plane indicated by the line 8—8 in FIG. 7.

The conduit 81 is provided with high pressure fittings 83 and 84 that connect the conduit to a branch tee 86, the third port of which is connected by an appropriate conduit 87 that passes through the side wall 21 of the pedestal 9 and passes into the interior of a control cabinet designated generally by the numeral 88 in FIGS. 6, 7 and 8, and shown diagramatically in FIG. 6 by the broken line outline. Within the control cabinet 88 there is provided an adjustable pressure regulator valve 89 connected into the conduit 87, with a flow switch 91 in turn being connected by a conduit 92, the actuator 93 of the flow switch being acted upon by the pressure in the flow switch housing to manipulate a contact bar 94 between open and closed conditions with terminal contact points 96 and 97. The pressure regulator valve 89 is provided with control knob 90 that extends outside the control cabinet for appropriate manipulation to increase or decrease the pressure exerted by the ram. The flow switch 91 is connected by a conduit 98 with a spring-pressed check valve 99, the check valve pressure being controlled by a control knob 101. Also connected to the conduit 87 by a tee connection 102 is a conduit 104 which is connected to gauge valve 106, the output from the gauge valve 106 being appropriately connected by a high pressure conduit 107 to a pressure gauge 108 that indicates on an appropriate dial pressure exerted by the ram.

Figure 9:
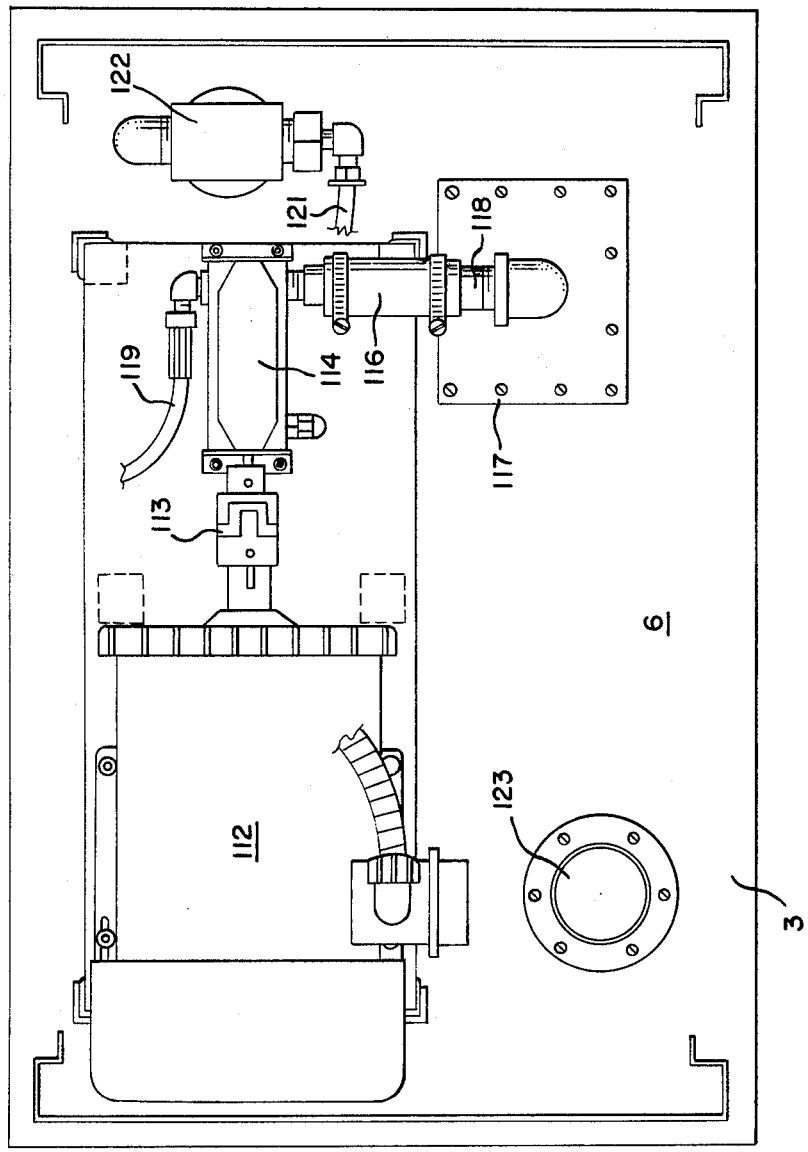
FIG. 9 is a fragmentary plan view of the lower hydraulic compartment and the hydraulic pump means associated with the hydraulic reservoir.

Referring to FIG. 9, there is there shown a fragmentary plan view of the lower hydraulic compartment and the hydraulic pump means associated with the hydraulic reservoir. As there shown, the electric motor 112 is mounted on the upper surface 6 of the reservoir 3 and within the cabinet 4 previously described. The electric motor 112 is conveniently a 1.5 horsepower, 230 volt, 3 phase, 1,200 RPM motor connected by a flexible coupling 113 to a hydraulic pump 114. The hydraulic pump is connected by a suction hose 116 to the interior of the reservoir 3 through an access plate 117 and an appropriate conduit 118 the other end of which within the reservoir is provided with an appropriate suction filter 118' (FIG. 6). The high pressure side of the hydraulic pump 114 is connected by a high pressure hose 119 to the "P" port of the four-way selector valve 82, while the return hose 121 (FIG. 9) is connected to the filter body 122 which filters hydraulic fluid being returned to the reservoir 3. The other end of the low pressure return hose 121 is connected to the "T" port of the four-way valve 82. The reservoir 3 is provided with a filler cap and dip-stick assembly 123, while the hydraulic circuit and the pump 114 are protected by a pressure relief valve 124 that may be adjusted for varying pressure levels from very low pressure in the order of ounces per square inch to very high pressure in the order of 3,000 lbs. per square inch.

Figure 10:
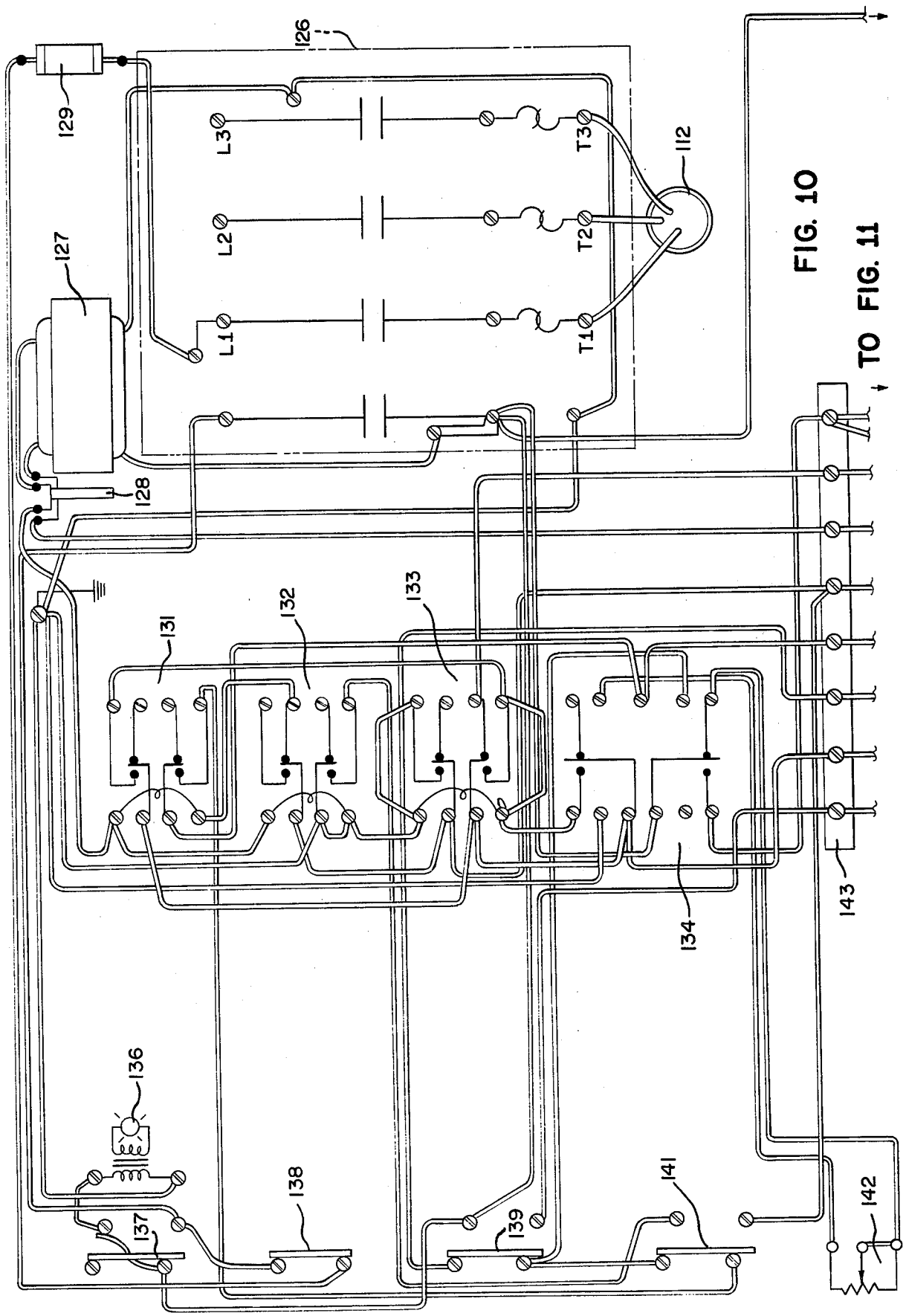
FIG. 10 is a diagrammatic view of the electrical control circuitry in the control cabinet.
Figure 11:
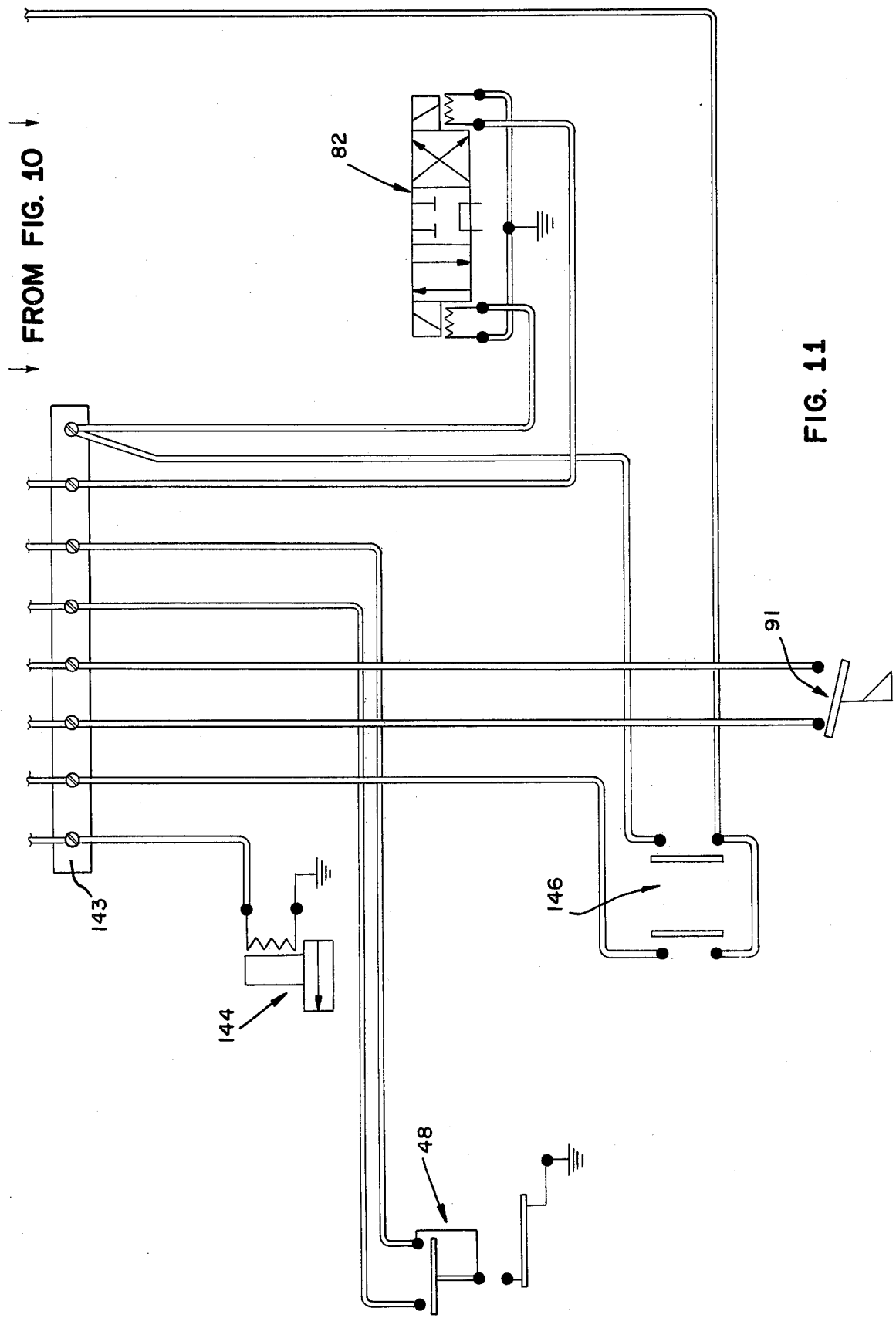
FIG. 11 is a continuation of the electrical circuitry in the electrical control cabinet.

The hydraulic press of the invention is also provided with a unique electrical control system illustrated diagrammatically in FIGS. 10 and 11.

Referring to FIGS. 10 and 11, the motor 112 is shown connected to a magnetic starter 126 which may conveniently be a Westinghouse component sold under Catalog No. A 200VACAC and suitable for use with a polyphase 1½ horsepower 230 Volt motor. A transformer 127, rectifier 128 and a fuse 129 are connected as shown to provide 6 Volts DC and 110 Volts AC for the control circuit. The control circuit includes a first electromagnetically operated relay 131, a second electromagnetically operated relay 132, a third electromagnetically operated relay 133 and a relay timer designated generally by the numeral 134. The relays 131, 132, 133 and the relay timer 134 are interconnected as shown in FIGS. 10 and 11 with associated control devices which will hereinafter be explained. The relays 131 and 132 are both six Volt DC double pole-double throw relays, while relay 133 is a 120 Volt Ac double pole-double throw relay. The relay timer 134 is a 110 Volt single shot double pole-double throw timer relay. All of these relays and the relay timer are commercially available plug-in modules or units. Relays 131, 132 and 133 are normally closed when in a neutral mode.

Figure 5:
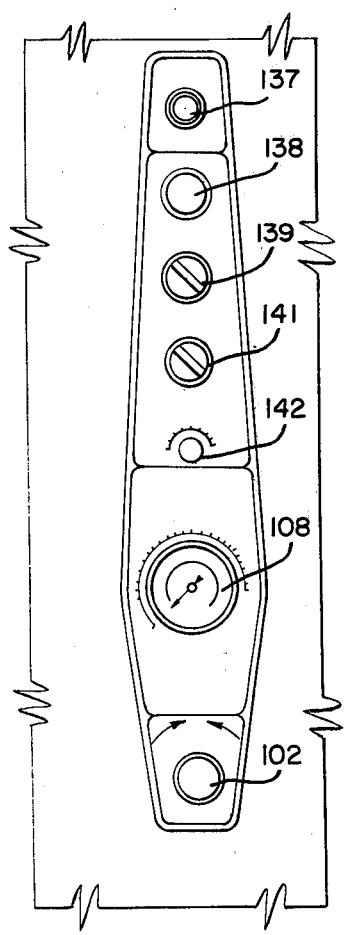
FIG. 5 is a front elevational view of the control panel of the hardware press assembly.

Also included in the control circuit is a "run" light 136 associated with the start button or "ON" switch 137, which is preferably a normally-open push botton-type switch to which access is had on the control panel as illustrated in FIG. 5. As there illustrated, the "ON" button may be of the illuminated type so that the light 136 illuminates the "ON" button when the "ON" button switch 137 is depressed. The control circuitry also includes an "OFF" button 138 and a "set up-run" selector switch 139 the function of which and its cooperation with the mechanical components of the apparatus will hereinafter be explained.

As illustrated in FIGS. 5 and 10, the control panel also includes a "conductive/non conductive" selector switch 141 manipulable in accordance to whether conductive or non-conductive materials are being run through the hardware press. Additionally, a timer reostat 142 is provided manipulable to control the time that it takes for the ram to return to its raised position. The switch elements 137, 138, 139, 141, and the reostat timer 142 are appropriately connected as illustrated in FIG. 11 to the relays 131, 132, 133 and the relay timer 134, and through an appropriate terminal board 143, are also connected to additional control devices as follows.

Included in the control circuit is a solenoid-operated gauge set-up valve designated generally by the numeral 144 and operative to permit adjustment of the apparatus to generate the required pressure and to indicate that pressure when the machine is being set-up but not during the "run" mode. In other words it protects the pressure gauge 108 when that gauge is of the type not having its own "damping" means. That safety switch assembly 48 comprising a normally-open microswitch has already been described in conjunction with the lower end of the hydraulic ram 42, while the pressure control switch 91 has also been designated in the explanation above with regard to the hydraulic circuit. The interrelationship and cooperation of the microswitch 48 and the pressure control switch 91 will be explained hereinafter in conjunction with the operation of the apparatus. Also included in the control circuitry is a foot-operated control switch designated generally by the numeral 146 and which constitutes the primary control for operating the apparatus after it has been conditioned for operation by the operator.

Summarizing the operation of the hardware press, after it has been installed by connection of terminals L1, L2 and L3 of the magnetic starter 126 to a three-phase source of power with a four-wire lead, one of which is a ground lead and is connected to the ground terminal G illustrated at the top of FIG. 10, the hardware press is ready to be set up for operation in a selected manner.

The operator first pushes the "ON" button 137, which activates the magnetic starter 126 and electric motor 112. The 110 Volt control circuit through fuse 129, which is tapped off terminal L1 is also activated. The effect of energizing the motor 112 is that the hydraulic pump 114 is activated, thus pressurizing the hydraulic circuit, which is held in a neutral pressurized condition until called upon to act.

At this point the operator must decide whether he is going to use the hardware press in conjunction with electrically conductive material or electrically non-conductive material, and he must install the tooling 73 and 74 that is appropriate to the material to be worked upon. Selector switch 141 is manipulated to select either conductive or non-conductive material.

The operator then sets the set-up/run switch 139 in the "run" mode and makes as many practice "runs" with the material he is running as is necessary to set the pressure exerted at the right amount for the job. In the "run" mode the gauge 108 will not indicate accurately the pressure exerted because the gauge lags the press. The proper pressure is selected by manipulation of the pressure control valve 102 in relation to the observed results of a practice "run." When observation of the end result of a "run" indicates that the pressure is optimum for the job, the set-up/run selector switch may be manipulated to the set-up mode, a set-up "run" made, and the gauge pressure now accurately reflecting pressure, noted for future reference on the same job or the same type of material. The selector switch 139 is then switched back to the "run" mode so that the press may function as intended in a standard production run.

To operate the press apparatus after it has been "set-up" as described above, the operator is provided with a foot-operated double-pole double-throw switch 146 which when depressed on one side, say the "down" side as shown schematically in FIG. 11, causes the ram to move downwardly, while depressing the other (up) side of the switch causes the ram to be raised to its maximum elevation. When the "down" side of the switch 146 is depressed, the relay timer 134 is connected into the 110 Volt control circuit, as is the relay 133, and through relay 133, the "down" side solenoid of the selector valve 82. As a consequence, the ram 42 moves downwardly under the impetus of hydraulic fluid under pressure admitted to the upper end of the cylinder 33 through high pressure line 81.

Assuming the operator keeps his foot on the "down" side of switch 146, the press will operate through one complete cycle, i.e., ram down under pressure to squeeze the work, and then ram up automatically to return to its previously selected neutral position in preparation for another cycle. During the "down" half of the cycle, when the pressure has reached the pre-set pressure selected by adjustment of the pressure relief valve 89, the relief valve opens and shunts full fluid pressure to pressure-actuated switch 91, the contacts of which "make" to complete a circuit through the relay timer 134 which de-energizes the "down" side solenoid of selector valve 82 and energizes the "up" side solenoid to actuate the valve to apply high hydraulic fluid pressure to the lower end of cylinder 33 to elevate the ram. The degree of elevation of the ram is controlled by the relay timer 134 and the "up-travel" control rheostat 142 to whatever degree has been pre-set in point of time, noting that the ram moves upwardly at the rate of about one inch per second. When the pre-set "up-travel" time has elapsed, the timer de-energizes the selector valve "up" side solenoid and returns to a neutral condition. Simultaneously, maximum pre-set pressure is again registered at the pressure switch, which energizes relay 133 in a manner to "break" the circuit to the "down" side of the selector valve and "latch" the relay in this condition as long as the operator retains his foot on the switch 146 to hold the "down side" contacts in a "made" condition, thus preventing the ram from descending. When the operator releases the foot switch 146, the relay 133 is "unlatched" and the circuit is conditioned for another cycle.

It should be noted that the operator does not have to depress the "up-side" of switch 146 to elevate the ram. The ram is elevated automatically as previously described. The purpose for the "up-side" contacts in foot-controlled switch 146 is to permit the operator to selectively elevate the ram beyond its pre-set limit so as to increase the space between the tooling, as might be needed to insert a complex or deep-drawn workpiece therebetween. Functionally, closing of the "up-side" contacts of switch 146 shunts power around the relay 133 and directly to the "up-side" solenoid of the selector valve 82, causing high pressure hydraulic fluid to flow momentarily to the lower end of the cylinder so as to selectively elevate the ram. Closing of the "up-side" contacts of the switch 146 momentarily does not modify the preset limit of automatic ram elevation as previously described. The apparatus is now conditioned for another cycle or another "squeeze."

SELECTOR SWITCH 141 SET IN CONDUCTIVE MODE

Assuming the selector switch 141 (FIGS. 5 and 10) has been set to "conductive," signifying a "set-up" of the press to work on an electrically conductive workpiece or material, if the operator's finger or hand comes into contact with the upper tool 74 as the ram and tool are descending, the ram will stop its descent and reverse its direction of travel, thus preventing injury to the operator. This mode of operation is accomplished through the cooperative relationships that exist between the upper and lower tools and tool holders, the micro-switch 48, and first and second relays 131 and 132, respectively.

Referring to FIGS. 2 and 3, when the tool comes in contact with the operator's finger, which is relatively non-conductive, the upper tool holder stops its descent while the ram continues downwardly. A downward translation of the ram of only 0.020" after the upper tool holder stops, causes closing of the micro-switch contacts, completing a circuit through leads 62 and 63 (FIGS. 3 and 11). However, the interposition of the operator's relatively non-conductive finger prevents current from flowing between the upper and lower tools 74 and 73, respectively, effectively blocking an electrically conductive path to ground which includes grounding strap 51. The functional effect of this is to switch the selector valve 82 from a "down" mode to an "up" mode, and to do this within the space of about 0.140", which is the space that normally exists between the upper end of skirt portion 67 and the shoulder 46 on the ram.

Closing of the micro-switch contacts by contact plate 57 energizes the first relay 131 through second relay 132. Relay 131 now triggers the timer relay 134 to "break" the circuit to the "down-side" solenoid of selector valve 82, while energizing the "up-side" solenoid of the selector valve, thus causing the ram to reverse its direction and be elevated out of contact with the operator's finger.

When the operator's finger is not interposed, a circuit is completed between the upper and lower tools, thus closing the negative ground circuit through grounding strap 51 and the lower tool, and energizing relay 132. Relay 132 is energized prior to the micro-switch 48 contacts being closed, thus breaking the ground circuit to relay 131, thus preventing the "safety" system previously described from being triggered "on," and permitting the ram to make its pressure squeeze.

SELECTOR SWITCH 141 SET IN NON-CONDUCTIVE MODE

Hydraulic presses of the type forming the subject matter of this invention are frequently used on material such as "plastics" that are electrically non-conductive. If the selector switch 141 is left in its conductive mode and a non-conductive material is attempted to be run, the ram will descend until the tool touches the non-conductive material and imposes a pressure of about two ounces. The ram will then be reversed by the safety circuit that includes micro-switch 48 and relays 131 and 132.

Accordingly, when it is desired to run non-conductive material, the selector switch 141 is re-adjusted to select a non-conductive mode as indicated by the indicia on the front panel. With the non-conductive mode selected, when the operator depresses the "down side" of the foot-operated switch 146, the ram will descend as before but, instead of the ram reversing its direction and elevating if it encounters the operator's finger (or the non-conductive workpiece), it comes to a complete stop upon the imposition of about two ounces of pressure on the operator's finger or the workpiece. This mode of operation permits the operator to withdraw his finger, which most operators will do instinctively as soon as the tool touches their finger.

To secure application of pressure by the tool from this point, the operator must lift his foot from the switch 146 and must then again depress the "down side" of that switch to initiate completion of the "squeeze" cycle of the ram. It is important to note that the operator may lift his foot from the switch 146, but such action will not initiate completion of the "squeeze" cycle. He must depress the switch 146 a second time before that occurs. Obviously, unless the operator is grossly negligent, he will have ample opportunity to withdraw his finger and thus avoid injury.

From the above and from the schematic of FIGS. 10 and 11, it will be apparent that current from the negative terminal of the rectifier 128 is channeled through the grounding strap 51 and into the upper tool holder when the micro switch 48 contacts are closed. It also passes through lead 62 to relay 131, which is not grounded to the frame of the press as is relay 132. Since the upper tool holder and tool are negatively charged by virtue of a conductive connection through grounding strap 51, when the upper and lower tools meet, or are otherwise conductively connected by a conductive workpiece, a circuit is completed through the frame of the press and through relay 132 which is grounded to the frame. It will thus be seen that the 6 Volt negative side of the safety circuit is isolated from the frame until a conductive path is formed between the upper and lower tool holders which, in effect, function as a "switch" to complete the circuit to ground when they meet or are electrically conductively connected.

In summary, it will be seen that the motor circuit operates from a three phase, 220 Volt power source and is activated by the magnetic starter 126. A second, press operating circuit of 110 Volts AC is tapped from the magnetic starter and is channelled through the "ON" button or switch 137 to activate the magnetic starter, the 110 Volt press operating circuit and the 6 Volt direct current safety circuit explained above, that controls the operation of the ram in specific instances.

Having thus described my invention, what is believed to be novel and sought to be protected by Letters Patent of the United States is as follows.

I claim:

1. A hardware press for assembling fastenening devices or punching holes in sheetmetal hardware devices and incorporating safety provisions to prevent injury to the operator, comprising:
   (a) a base structure;
   (b) a pedestal assembly on the base structure and including a cantilever arm portion projecting laterally therefrom;
   (c) a pressure-exerting ram assembly mounted on said cantilever arm adjacent the free end thereof and including a hydraulic cylinder and a double-acting ram operatively associated therewith and selectively movable through a predetermined excursion along its longitudinal axis, said ram assembly being electrically insulated from said cantilever arm on which it is mounted;
   (d) an anvil mounted on said pedestal and underlying said ram assembly;
   (e) an upper tool holder slidably mounted on said ram in electrically conductive interrelation therewith and adapted to removably support a selected upper tool thereon;
   (f) a lower tool holder mounted on said anvil in electrically conductive interrelation therewith and adapted to removably support a selected lower tool thereon in cooperative relation to said upper tool; and
   (g) control means for normally selectively advancing said ram under a predetermined high hydraulic pressure to bring said upper and lower tools together into a predetermined pressure exerting relationship upon a workpiece interposed therebetween with a pressure injurious to the operator if imposed on the operator's hand while automatically stopping advance of the ram if the operator's hand is encountered between the upper and lower tool holders;
   (h) said control means including a normally-open safety switch operatively interposed between said ram and said upper tool holder and operable to close a circuit to stop the advance of the ram when a non-conductive element, such as the operator's hand, is encountered with sufficient force to slidably displace said upper tool holder to close said normally-open switch.

2. The combination according to claim 1, in which said control means includes a double-pole, double throw conductive/non-conductive mode selector switch manipulable to condition the control means in relation to whether the workpiece is electrically conductive or non-conductive, and a ram-actuating switch which must be depressed twice to impose said predetermined operating pressure upon a non-conductive workpiece.

3. The combination according to claim 1, in which said control means includes a hydraulic circuit and an electrical circuit, said hydraulic circuit including a hydraulic pump actualble to selectively pressurize said pressure-exerting ram assembly and an electrically operated valve for controlling the flow of hydraulic fluid through said circuit, said electrical circuit including solenoids associated with said valve for controlling the flow of hydraulic fluid, and a plurality of interconnected relays operable to control the retraction of the pressure-exerting ram when an operator's hand is encountered between the upper and lower tools.

4. The combination according to claim 1, in which said control means includes a ground potential circuit of which the upper and lower tool holders form an electrically conductive part.

5. The combination according to claim 1, in which said control circuit includes said upper and lower tools as the terminal of a grounding circuit which is completed when a conductive workpiece is interposed therebetween thus enabling the ram to advance in a pressure-exerting mode and which is not completed when a non-conductive element such as the operator's hand is interposed between the upper and lower tool holders, thus stopping the advance of the ram before an injurious pressure is exerted thereby.

6. The combination according to claim 1, in which said control means includes an electrical circuit and a hydraulic circuit, said electrical circuit including a foot-operated double-pole, double-throw switch which when actuated in one mode effects advancement of the ram and when actuated in the opposite mode effects retraction of the ram, a relay timer energized when said foot-operated switch is actuated in a ram-down mode to effect elevation of the ram upon completion of a cycle, and a reostat for controlling the relay timer to determine the degree of elevation of said ram.

7. A hardware press for assembling fastenening devices or punching holes in sheetmetal hardware devices and incorporating safety provisions to prevent injury to the operator, comprising:
   (a) a base structure;
   (b) a pedestal assembly on the base structure and including a cantilever arm portion projecting laterally therefrom;
   (c) a pressure-exerting ram assembly mounted on said cantilever arm adjacent the free end thereof and including a hydraulic cylinder and a double-acting ram operatively associated therewith and selectively movable through a predetermined excursion along its longitudinal axis, said ram assembly being electrically insulated from said cantilever arm on which it is mounted;
   (d) an anvil mounted on said pedestal and underlying said ram assembly;
   (e) an upper tool holder slidably mounted on said ram in electrically conductive interrelation therewith and adapted to removably support a selected upper tool thereon;
   (f) a lower tool holder mounted on said anvil in electrically conductive interrelation therewith and adapted to removably support a selected lower tool thereon in cooperative relation to said upper tool; and (g) control means for normally selectively advancing said ram under a predetermined high hydraulic pressure to bring said upper and lower tool together into a predetermined pressure exerting relationship upon a workpiece interposed therebetween with a pressure injurious to the operator if imposed on the operator's hand while automatically stopping advance of the ram if the operator's hand is encountered between the upper and lower tool holders;

(h) said control means including a normally-open safety switch interposed between said ram and said upper tool holder and adapted to be closed to complete an electrical circuit if an operator's hand or other electrically non-conductive element is disposed between the upper and lower tools, and a pressure-actuated control switch actuated by hydraulic pressure and including normally-open terminals adapted to be closed to make a circuit to effect elevation of the ram.

* * * * *